United States Patent
Oren et al.

(10) Patent No.: US 8,451,989 B2
(45) Date of Patent: May 28, 2013

(54) TELEPHONE COMMUNICATION SYSTEM NETWORK INTEGRATED WITH SALES PROMOTION MEDIA

(75) Inventors: Amichay Oren, Rosh-A-Ayin (IL); Shuky Barbash, Tel Aviv (IL); Roman Scharf, Oberwaltersdorf (AT); Daniel Mattes, Wells (AT)

(73) Assignee: Jajah, Inc., Mountain View, CA (US)

( * ) Notice: Subject to any disclaimer, the term of this patent is extended or adjusted under 35 U.S.C. 154(b) by 621 days.

(21) Appl. No.: 12/530,879

(22) PCT Filed: Mar. 11, 2008

(86) PCT No.: PCT/IL2008/000330
§ 371 (c)(1),
(2), (4) Date: Jun. 17, 2010

(87) PCT Pub. No.: WO2008/111059
PCT Pub. Date: Sep. 18, 2008

(65) Prior Publication Data
US 2010/0254520 A1 Oct. 7, 2010

Related U.S. Application Data

(60) Provisional application No. 60/906,208, filed on Mar. 12, 2007.

(51) Int. Cl.
*H04M 1/64* (2006.01)
*H04M 3/42* (2006.01)

(52) U.S. Cl.
USPC .................................. 379/88.11; 379/201.02

(58) Field of Classification Search
USPC ... 379/88.01–88.23, 265.01–266.01; 709/231
See application file for complete search history.

(56) References Cited

U.S. PATENT DOCUMENTS

| 5,652,784 | A | 7/1997 | Blen et al. |
| 6,603,844 | B1 | 8/2003 | Chavez, Jr. et al. |
| 7,003,083 | B2 | 2/2006 | Kovales et al. |
| 2007/0003040 | A1 | 1/2007 | Radziewicz et al. |
| 2010/0226483 | A1 * | 9/2010 | den Hartog ................ 379/88.11 |

FOREIGN PATENT DOCUMENTS
EP 1081928 A2 * 3/2001

OTHER PUBLICATIONS

International Search Report in corresponding International Patent Application PCT/IL08/00330, mailing date of Sep. 2, 2008 (3 pages).
International Preliminary Report on Patentability for International Application No. PCT/IL2008/000330 issued on Sep. 15, 2009.
International Search Report dated Sep. 2, 2008, issued in corresponding international application No. PCT/IL2008/000330.

* cited by examiner

*Primary Examiner* — Mohammad Islam
(74) *Attorney, Agent, or Firm* — Ostrolenk Faber LLP

(57) ABSTRACT

Methods of playing audio commercials to telephone users while waiting for a connection to be completed are known. This disclosure relates to better targeting such commercials. In the proposed telephone network, the service provider makes use of data relating to the personal profile of any contacting subscriber, previously collected during a registration process. A database is used to select the commercial best matching the profile.

10 Claims, 3 Drawing Sheets

TELEPHONE COMMUNICATION SYSTEM NETWORK INTEGRATED WITH SALES PROMOTION MEDIA

CROSS REFERENCE TO RELATED APPLICATIONS

The present application is a 35 U.S.C. §371 National Phase conversion of PCT/IL2008/000330, filed Mar. 11, 2008, which claims benefit of U.S. Provisional Application No. 60/906,208, filed Mar. 12, 2007, the disclosure of which is incorporated herein by reference. The PCT International Application was published in the English language.

FIELD AND BACKGROUND OF THE INVENTION

In view of the ever-growing demand for telephony services, the competition amongst providers of these services becomes more and more fierce. This is particularly true with regard to the cellular phone companies, which virtually fight for every additional customer, e.g. by offering various kinds of benefits, besides cutting their prices as low as possible and thus trying to expand the time we use their services beyond the regular calling time.

An attempt to maximize the revenue of the communication providers has been in the form of injecting advertising announcements during the process of establishing the connection between the calling party and the called party, mostly on the background of the ring back tone signal (cf. U.S. Pat. No. 6,603,844).

A further step in this direction has been to customize as far as possible the content of the advertisement to the actual calling party. This was accomplished by tracing, e.g. the social economic or demographic background of customers by identifying their residence area reflected by their subscriber number (which is necessarily stored in the provider's databank for billing purposes).

Other parameters used in this connection were time and dates of the calls, and/or details associated with the destination of the call which might reflect back on the calling party characteristics.

Obviously, the success of the method could only be measured in statistical terms.

It should be stated that currently, advertisers are able to advertise the same advertisement only on a single platform namely television, radio, Internet, phone, billboards, newspapers, verbally etc., but not simultaneously.

The rather recent implementation of hybrid devices, supporting both audio and video, has opened new horizons regarding the customization of ads more accurately and efficiently, as will be exemplified below. These devices include, but not limited to, personal computers, PDA's, Blackberry and hand-held computers.

Moreover, since these devices involve the use of the internet in several configurations, namely wired or wireless, new and diverse communication methods were introduced. Under this category, the use of the Voice Over Internet Protocol technology has drastically increased.

Accordingly, more companies offer VOIP communication services, at relatively more attractive rates.

A typical VOIP system is outlined in FIG. 1, which is self-explanatory.

On this background, it is the prime object of the present invention to offer to the commercial advertising enterprises a new, customized multiple media platform system that will allow the use of a combined audio and web campaigns (video, image, and so forth), in combination with state of the art communication services.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will prevail. In addition, the materials, methods, and examples are illustrative only and are not intended to be necessarily limiting.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

SUMMARY OF THE INVENTION

A communication network comprising a telephone communication service provider accessible by a plurality of subscribers; a database containing certain personal characteristics of every subscriber; a database of audio/video sales promotional multimedia files; means for selecting a multimedia file best matching any of said personal characteristics; means for identifying any of the subscribers upon attempting to place a call; and means for playing the said selected multimedia file to the subscriber at least during the time between placing the call and establishing communication with the called party.

BRIEF DESCRIPTION OF THE DRAWINGS

These and additional constructional features and advantages of the present invention will become more readily understood in the light of the ensuing description of preferred embodiments thereof, given by way of example only, with reference to the accompanying drawings, wherein—

DESCRIPTION OF SOME OF THE EMBODIMENTS

Some embodiments of the invention are herein described, by way of example only, with reference to the accompanying Figures. With specific reference now to the Figures in detail, it is stressed that the particulars shown are by way of example and for purposes of illustrative discussion of some embodiments of the invention. In this regard, the description taken with the Figures makes apparent to those skilled in the art how some embodiments of the invention may be practiced.

As known, customers who wish to subscribe to communication services are usually required to undergo a one-time registration process which normally includes recordal of their personal and contact details (name, address, age, gender, home phone number, office phone number, cell phone no., etc.) as well as main fields of interest such as occupation, pass-time activities and hobbies, thus creating a general profile of the respective subscriber.

Figure 1:
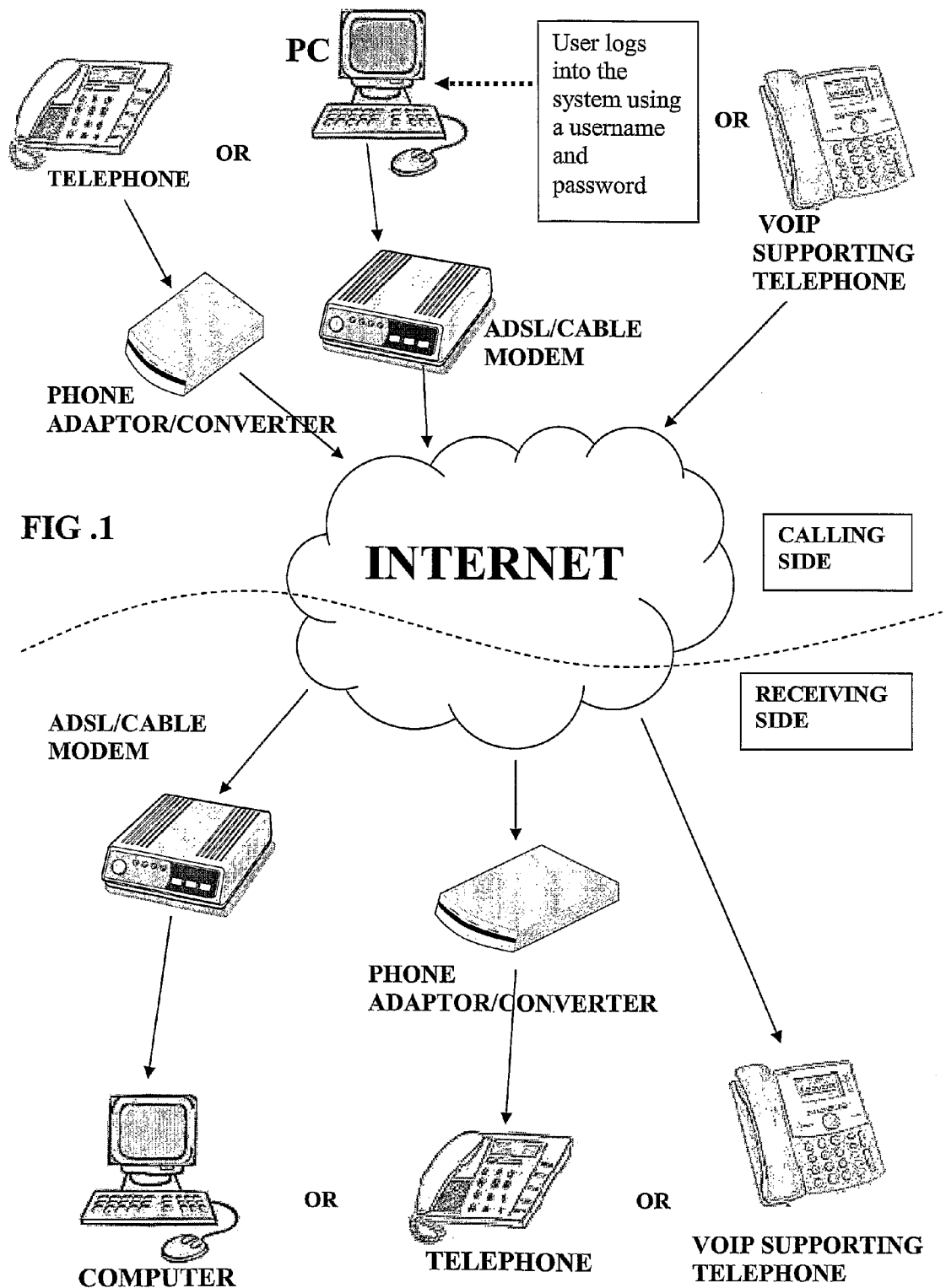
FIG. 1 illustrates a typical web-supported telephony environment.
Figure 2:
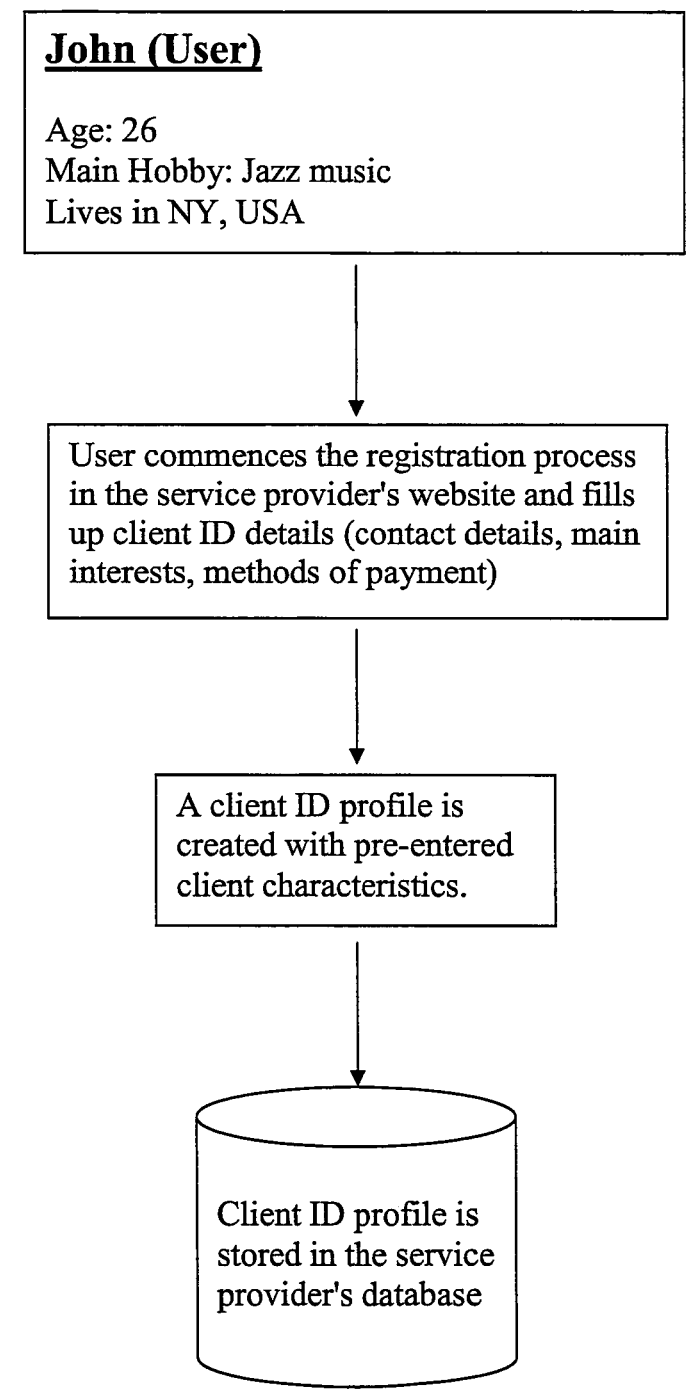
FIG. 2 illustrates a typical logging-in registration.

A typical account registration process is outlined in FIG. 2.

From the standpoint of advertisers, this information is extremely valuable. It will facilitate the targeting of ads in a much more effective way compared with the conventional methods described above, at relatively negligible extra costs to the service provider.

Therefore, usually when a subscriber wishes to place a call through one of the VOIP or other providers, he/she will need first to log-in to his/her personal account at the service provider's website. The provider's database will not only identify the caller, but also upload the user's profile containing background information relevant for matching the class of ads most closely fitting his/her taste. Subscriber may also be exposed to "general" advertisements, at the advertiser's option.

Once the subscriber logs into his account and then initiates a call, the service provider will initiate a service based on cross-media platforms, namely the ability to hear audio signals concurrently with multimedia files. The subscriber is then able to listen to the ongoing advertisement through his/her cell phone device, land-line phone, or, if making the call intermediate a computer, to watch multimedia files (for example video feed or image feed) on his personal webpage at the service provider's website, or retrieved from a third party files bank. The media files will continue to be displayed for as long as the subscriber is logged-in to his account on the service provider's website.

Figure 3:
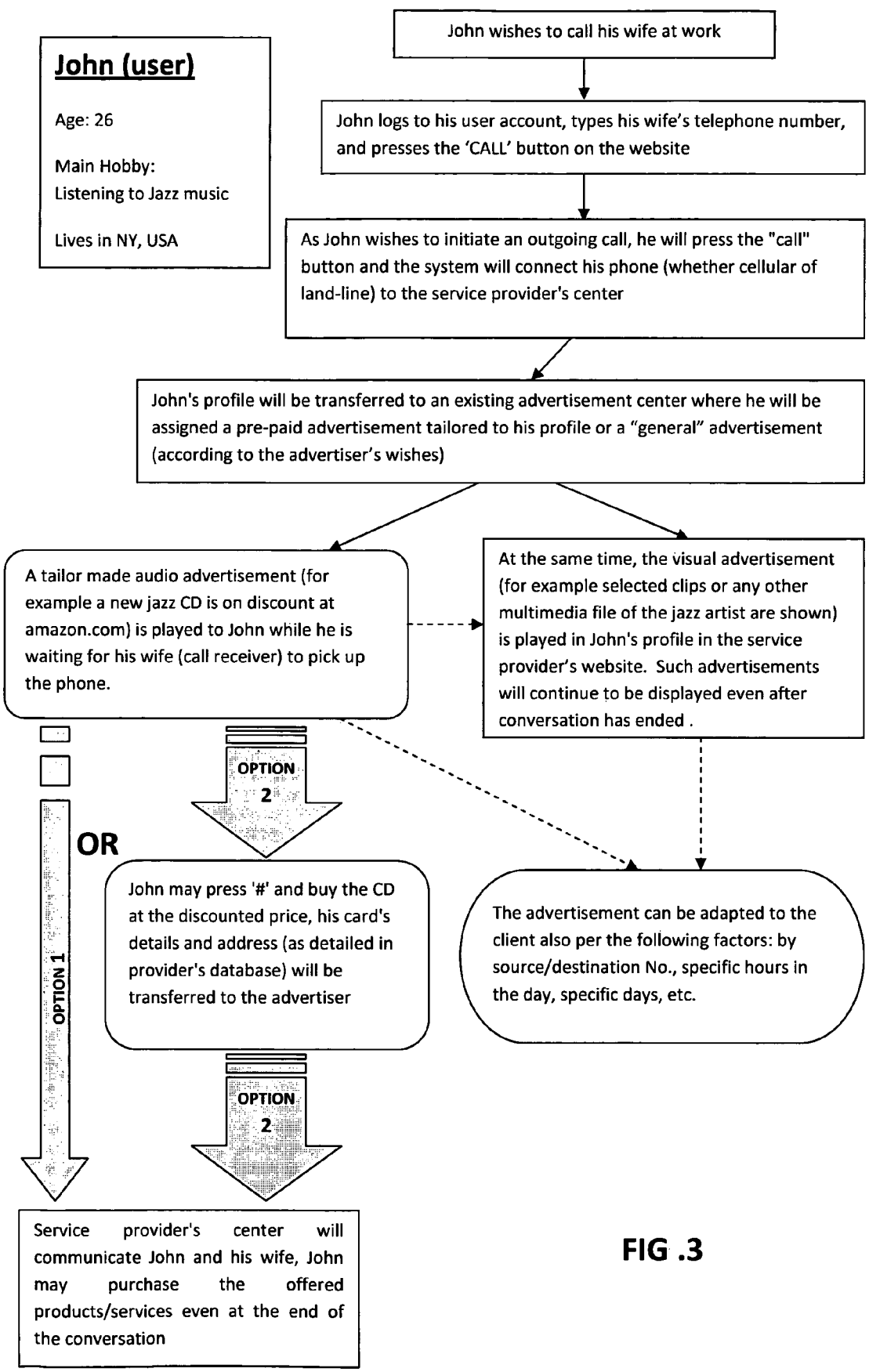
FIG. 3 exemplifies the operation of a system featuring the characteristics of the present invention.

This invention, as explained above, will be exemplified by a cross platform typical call scenario as described is FIG. 3.

John, a 26-year-old male, lives in New York, USA, and likes to listen to jazz music. John wishes to call his wife at work. As john has access to computer-based devices, as mentioned above, or, if his cell phone is equipped with an appropriate pre-installed application, or, in case he uses a cell phone that can access the service provider's website, he will log into his account at the service provider's database.

Shortly after John presses the "call" button, the system provider will connect John (through his cell or landline telephone devices) to his wife and while he waits for his wife to answer the call, the service provider's database system will assign John with a tailor-made advertisement according to one or more of the personal characteristics stored in the service provider's database (or via a third party according to an arrangement with the service provider). Hence, John will listen to the audio commercial on his device (whether cellular or landline) as well as watch the video or image feed (on the computer display screen) stored in his account at the service provider's database.

In the present example, the advertisement will be based on John's pre-stored profile (the fact that he likes jazz music) and/or other relevant factors such as the date and/or hour of the day.

For example:
(1) An offer of one burger free on McDonalds when ordering a big Mac at the McDonald's branch at the Lincoln business center is valid between $12^{00}$-$14^{00}$ only today;
(2) 15% off on all jeans at GAP nearby store, valid only on this coming Sunday through Tuesday.

This use of multimedia cross platform system will allow advertiser to get subscriber's attention, providing him with targeted information.

It should be noted that in less common cases, John may call his wife outside the office only through his cell phone (which does not support Internet access), in which case, John will initiate a phone call through a pre-installed application and receive the personalized advertisement in audio solely.

In all of the aforementioned cases, the time period during which John is exposed to an advertisement need not be confined to the length of the "waiting time," as in the above example. On the contrary, since the calling party is normally exposed to the incoming media through his broadband supported, portable or stationary devices, the web campaign may continue to be displayed to John indefinitely, even long after the recipient of the call picked-up the call, and even after the conversation has ended. Thus, John can continue to "receive" combined audio and web campaigns irrespective of the connection with the called patty having been started, or terminated.

Therefore, an advertiser may take advantage of user's exposure to the web campaign combined with the audio campaign, by using the user's pre-created profiling system and allowing user at any time to follow up on the product offered, and to be directed to purchase the products/services or to receive further details relating to such and/or similar products, if user chooses to do so.

According to yet another option offered by the invention, John will be enabled to press a pre-defined key to purchase or receive further information at the end of his current conversation with his wife.

In case John is interested in a certain commercial offer, he may follow up and press a key such as the "#", or by pressing the image or video feed displayed on his account web-page at the service provider's website, and to buy, e.g. an offered CD. His credit card, matching the one at the service provider's database, will be billed as well as John's address will be provided to the advertising third party by the service provider, at John's consent, so that the item may be sent to John shortly thereafter.

The system and method as exemplified above, may be implemented on currently used personal PC's or any other device that will support broadband connection and will be able to combine audio and web feeds simultaneously such as portable DVD players, media centers etc. Assuming these will support wired/wireless Internet connection, advertiser will have the option, by using the pre-created profiling system, to offer users tailor-made advertisements or "general" advertisements enabling user to follow up by e.g. purchasing the offered products/services, that have been intentionally directed to such user knowing in advance his/hers preferences.

Many other variations and modifications of the invention will be readily apprehended.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with some specific embodiments thereof, many alternatives, modifications and variations will be apparent to one skilled in the art upon perusal of the description and figures. Accordingly, the invention embraces all alternatives, modifications and variations that fall within the spirit and broad scope of the appended claims.

Section headings are used herein only to ease understanding of some embodiments and should not be construed as necessarily limiting.

What is claimed is:

1. A communication network comprising:
   (a) a telephone communication service provider accessible by a plurality of subscribers via a computer network;
   (b) a first database containing certain personal characteristics of every subscriber;
   (c) a second database of audio and video sales promotion multimedia files;
   (d) means for selecting a multimedia file best matching any of said personal characteristics of a subscriber; wherein said means for selecting a multimedia file selects a multimedia file based on the location of the subscriber, and the time and the date of the placing of a call by the subscriber;
   (e) means for identifying any of the subscribers upon attempting to place a call; and
   (f) means for playing a selected multimedia file to a subscriber at-least during the time between placing a call and establishing communication with a called party, wherein the selected multimedia file is selected from the second database by the means for selecting a multimedia file based on a personal characteristic of the subscriber in the first database when placing a call to a called party; wherein the file is played in the background of the dial tone.

2. The communication network as claimed in claim 1, wherein the file is played in the background of a busy tone.

3. The communication network as claimed in claim 1, wherein the file is played instead of the dial tone.

4. The communication network as claimed in claim 1, wherein the file continues to be played after the termination of the communication.

5. The communication network as claimed in claim 1, comprising further means enabling the subscriber to provoke a signal by which a purchase transaction is completed.

6. The communication network as claimed in claim 1, wherein the network is based on VoIP.

7. The communication network as claimed in claim 1, wherein the multimedia files are provided by a third party.

8. The communication network as claimed in claim 1, wherein said means for selecting a multimedia file selects a multimedia file based on location of the subscriber.

9. The communication network as claimed in claim 1, wherein the selected multimedia file is played for the subscriber only.

10. The communication network as claimed in claim 1, wherein said means for selecting a multimedia file selects a multimedia file based on the time and the date of the placing of a call by a subscriber.

* * * * *

UNITED STATES PATENT AND TRADEMARK OFFICE
CERTIFICATE OF CORRECTION

PATENT NO. : 8,451,989 B2  Page 1 of 1
APPLICATION NO. : 12/530879
DATED : May 28, 2013
INVENTOR(S) : Oren et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this
Eighth Day of September, 2015

Michelle K. Lee
*Director of the United States Patent and Trademark Office*